(12) United States Patent
Lindholm

(10) Patent No.: US 6,477,207 B1
(45) Date of Patent: Nov. 5, 2002

(54) METHOD AND APPARATUS FOR IMPLEMENTING A TRANSMISSION CONNECTION

(75) Inventor: Jari Lindholm, Helsinki (FI)

(73) Assignee: Nokia Networks Oy, Helsinki (FI)

( * ) Notice: Subject to any disclaimer, the term of this patent is extended or adjusted under 35 U.S.C. 154(b) by 0 days.

(21) Appl. No.: 09/450,367

(22) Filed: Nov. 29, 1999

Related U.S. Application Data

(63) Continuation of application No. PCT/FI98/00465, filed on Jun. 1, 1998.

(30) Foreign Application Priority Data

Jun. 2, 1997 (FI) .................................................. 972346

(51) Int. Cl.[7] ......................... H04L 27/28; H04L 27/10; H04L 27/18; H04K 1/10
(52) U.S. Cl. ...................................... 375/260; 375/279
(58) Field of Search ................................. 375/260, 279; 370/70

(56) References Cited

U.S. PATENT DOCUMENTS

| | | | |
|---|---|---|---|
| 4,947,408 A | * 8/1990 | Sadr et al. ...................... 375/94 |
| 4,961,160 A | * 10/1990 | Sato et al. ............. 364/724.01 |
| 5,247,515 A | * 9/1993 | White ......................... 370/70 |
| 5,299,192 A | * 3/1994 | Guo et al. ..................... 370/70 |
| 5,307,157 A | * 4/1994 | Kobayashi et al. ......... 348/708 |
| 5,587,939 A | * 12/1996 | Soleymani et al. ..... 364/724.16 |
| 5,640,424 A | * 6/1997 | Banavong et al. .......... 375/316 |
| 5,838,268 A | * 11/1998 | Frenkel ....................... 341/11 |
| 5,872,480 A | * 2/1999 | Huang ........................ 329/304 |
| 5,881,107 A | * 3/1999 | Termerinac et al. ........ 375/259 |
| 6,035,000 A | * 3/2000 | Bingham ..................... 375/296 |
| 6,144,711 A | * 11/2000 | Raleigh et al. ............. 375/347 |

FOREIGN PATENT DOCUMENTS

| | | |
|---|---|---|
| EP | 668 679 | 8/1995 |
| EP | 714 189 | 5/1996 |
| EP | 719 005 | 6/1996 |
| GB | 2 311 196 | 9/1997 |
| WO | 95/28773 | 10/1995 |
| WO | 97/48206 | 12/1997 |

OTHER PUBLICATIONS

"Multirate Digital Signal Processing" Fliege, N.J. Hamburg University of Technology, John Wiley and Sons, 1994.

\* cited by examiner

*Primary Examiner*—Chi Pham
*Assistant Examiner*—Tony Al-Beshrawi
(74) *Attorney, Agent, or Firm*—Altera Law Group

(57) ABSTRACT

The invention relates to a method for implementing a transmission connection. In accordance with the method, symbols (DATA_IN) are formed from the bit stream to be transmitted, carriers are generated on several different frequency bands, and the bit stream is transmitted with the aid of the carriers by dividing the formed symbols between the carriers in such a way that each carrier is modulated with some of the bits in the bit stream. To enable implementation of modulation and demodulation in such multicarrier systems with as simple and efficient equipment as possible, the modulated carriers are first generated on the transmitter side each separately on predetermined first frequencies, whereafter at least some of the carriers are supplied to a halfband filter bank (64) transferring at least some of the carriers supplied to it to their final frequency bands in the frequency domain and combining said carriers to its output. Halfband filter bank is also used in the receiver.

12 Claims, 10 Drawing Sheets

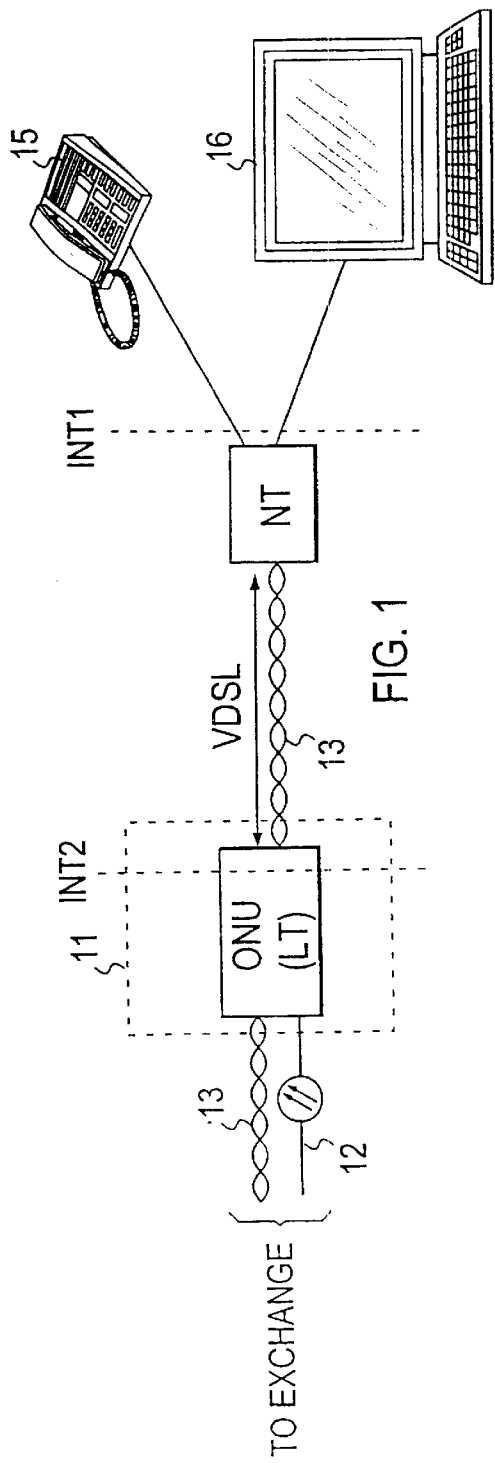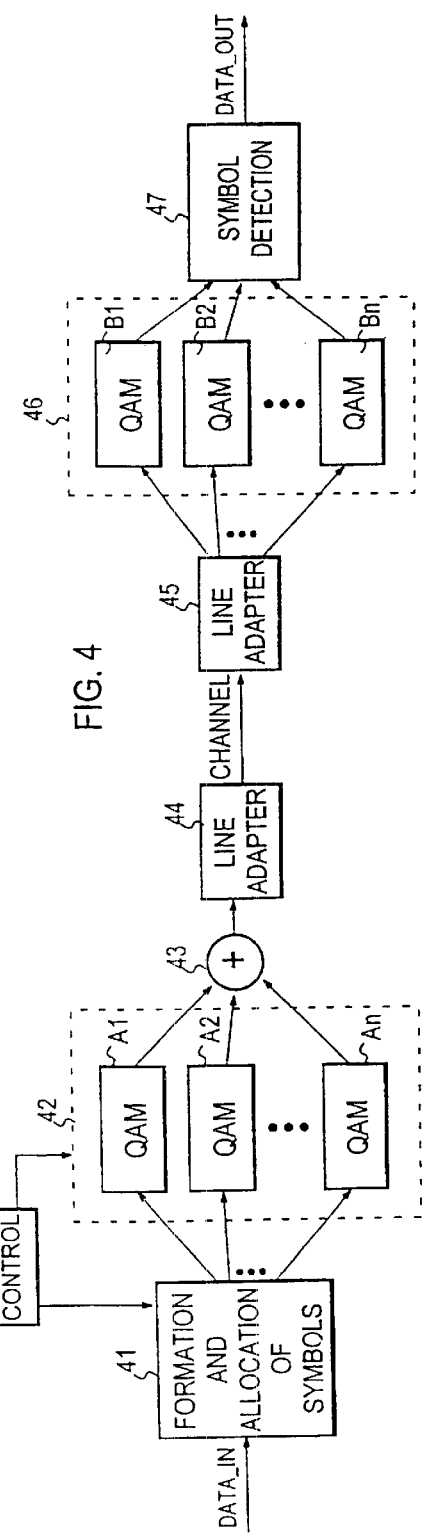

METHOD AND APPARATUS FOR IMPLEMENTING A TRANSMISSION CONNECTION

This application is a continuation of PCT/FI98/00465 filed Jun. 1, 1998.

FIELD OF THE INVENTION

The invention relates generally to implementation of a transmission connection using digital modulation. The invention can be used in any system in which the bit stream to be transmitted is divided onto several carriers located on different frequency bands, but the invention is especially intended for implementation of a wireline transmission connection with the aid of VDSL (Very high bit rate Digital Subscriber Line) technology.

BACKGROUND OF THE INVENTION

Optical fiber is a self-evident choice as transmission medium for a trunk network, because trunk connections usually need a high transmission capacity, the transmission distances used are long and existing routes are often found for the cables. Even for subscriber connections (the line between the local exchange and the subscriber) the situation is rapidly changing, because various services implemented with multimedia and demanding a high transmission rate will be everyday services also from the viewpoint of the private consumer.

However, no significant savings can be expected in the costs of constructing future networks offering broadband services, because the costs arise mainly from cable installation costs. However, it would be desirable to build as much optical fiber as possible also in subscriber networks, because it can be clearly seen that it will be needed in the future. The costs of renewing subscriber networks are very high, however, and in terms of time decades are in fact at issue in this context. High costs are indeed the worst obstacle to the spreading of the fiber into subscriber networks.

For the reasons mentioned above, more efficient measures than before have been taken in order to find out how to utilize the conventional subscriber line (the metal wire pair) for high speed data transmission, that is, for transmission rates clearly above the rate (144 kbit/s) of the ISDN basic access. The present ADSL (Asymmetrical Digital Subscriber Line) and HDSL (High bit rate Digital Subscriber Line) techniques do indeed offer new possibilities for high-rate data and video transmission along the wire pair of a telephone network to the subscribers' terminals.

The ADSL transmission connection is asymmetrical in that the transmission rate from network to subscriber is considerably higher than from subscriber to network. This is due to the fact that the ADSL technique is intended mainly for various so-called "on-demand" services. In practice, in the ADSL transmission connection the transmission rate from network to subscriber is in an order of 2 . . . 6 Mbit/s and from subscriber to network in an order of 16 . . . 640 kbit/s (a mere control channel).

The HDSL transmission technique concerns transmission in a metal wire pair of a digital signal of 2 Mbit/s level. HDSL represents a symmetrical technique, that is, the transmission rate is the same in both directions. The individual HDSL transceiver system comprises transceivers using echo-cancellation technology, which are interconnected by way of a bi-directional transmission path formed by a wire pair. In a HDSL transmission system the number of such individual transceiver systems may be one or two or three in parallel, whereby in a case of two or three pairs in parallel the rate to be used in each parallel transmission connection is 2 Mbit/s sub-rate; 784 kbit/s if there are three pairs in parallel and 1168 kbit/s if there are two pairs in parallel. It is defined in international recommendations how signals of 2 Mbit/s level are transmitted in a HDSL system, such as, for example, VC-12 signals of a SDH network or 2048 kbit/s signals in accordance with the G.703/G.704 recommendations of the CCITT.

Since only such bit rates are achieved with the solutions mentioned above, which are typically in the order of 1 . . . 2 Mbit/s, a technique allowing ATM level bit rates has been sought for the subscriber line cable. A specification of VDSL equipment is in fact being made by the international standards institute ETSI (European Telecommunications Standards Institute). The intention is that a VDSL transmission connection implemented in a metal wire pair of a telephone network will be able to transmit ATM cells between a telephone network and a subscriber terminal.

For example a VDSL connection can be implemented in such a way that predetermined frequency bands are allocated to both transmission directions and the data is modulated to the frequency bands of the transmission direction by generating a carrier for each frequency band in a separate modulator, in which the data is modulated in one phase to the final frequency band. The drawback of such a solution is that pulse shaping (interpolation and filtering) and frequency shifting (mixing) must be carried out in the modulator at a high frequency, which requires heavy computation and makes the equipment relatively complex. In the case of a VDSL connection, for example, the pulse shaping and mixing require computation operations to be performed at as high a rate as 30-fold sampling frequency, since some of the carriers are located at high frequencies. This will be described in detail hereinbelow.

SUMMARY OF THE INVENTION

The purpose of the present invention is to bring about an improvement on the drawback presented above by providing a solution allowing implementation of modulation and demodulation with as simple and efficient equipment as possible in systems of this type in which the bit stream to be transmitted is transported on carriers located on several different frequency bands.

This objective is achieved through a solution according to the invention which is defined in the independent claims.

The idea of the invention is to perform the frequency shift of signals to their final frequency bands by using a halfband filter bank that is computationally a very efficient design.

On account of the solution in accordance with the invention, the majority of signal processing required by digital modulation and demodulation can be carried out at low frequencies, since in transmission and reception the frequency shift is performed with a computationally efficient halfband filter bank.

In a method according to the invention some simple modulation method is utilized, preferably, for example, QAM (Quadrature Amplitude Modulation) or CAP (Carrierless Amplitude and Phase) modulation.

BRIEF DESCRIPTION OF THE DRAWINGS

In the following, the invention and its advantageous embodiments are described in closer detail referring to examples shown in the appended drawings, wherein FIG. 1 illustrates a transmission system utilizing a VDSL connection;

FIG. 4 shows a basic form of apparatus for implementing a VDSL connection;

DETAILED DESCRIPTION OF THE INVENTION

Figure 2:
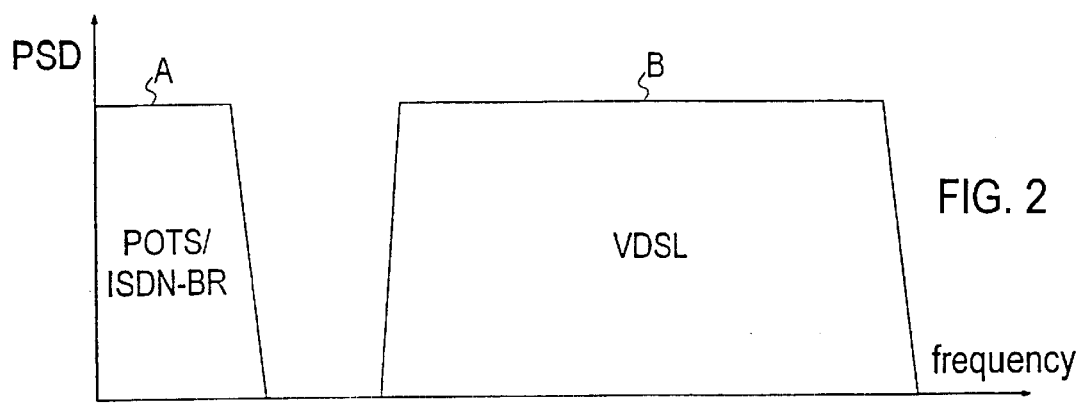
FIG. 2 illustrates a frequency division for use in the VDSL connection.

In the following, the solution in accordance with the invention will be described in detail using implementation of a VDSL connection as an example. The solution in accordance with the invention is of particular advantage specifically in VDSL systems in which carriers are located at high frequencies, thus also aggravating the above drawbacks.

FIG. 1 illustrates the structure of a system utilizing a VDSL connection. The system architecture complies with the so-called FTTC (fiber to the curb/cabinet) structure. The cabinet or curb 11 receives data over a high-speed optical fiber connection indicated by reference number 12. Existing metallic lines (copper pairs) also pass through the same cabinet from exchange to subscriber. These copper pairs are indicated by reference number 13. In the optical network unit (ONU) located in the cabinet the high-speed data are combined onto the subscriber line so that the subscriber may still use old narrow-band POTS/ISDN services, but besides these a high-speed full-duplex data connection is available to him/her. These narrow-band and broad-band services are separated from one another by a (passive) filter, which performs frequency separation of VDSL signals and narrow-band signals. The VDSL connection proper is formed between the ONU and the network terminal NT. The network terminal is typically located on the premises of the end user (subscriber) and is connected to the subscribers terminal equipment, for example, to an ordinary analog telephone or an ISDN telephone (reference number 15) or to a terminal equipment (TE) utilizing broadband services, such as, for example, a microcomputer (reference number 16). The network terminal provides the end user with UNI (User to Network Interface) interfaces in accordance with the standard. This interface is indicated by reference mark INT1. The broadband VDSL interface provided by the optical network unit is indicated by reference mark INT2.

The actual VDSL connection is thus set up between the ONU and the network terminal NT.

The frequency division of the VDSL connection is made in accordance with FIG. 2 so that on low frequencies space is left for existing POTS or ISDN services (frequency band A). The VDSL channels are transferred on frequency band B, the lower limiting frequency of which is typically 300 . . . 600 kHz and upper limiting frequency preferably about 18 MHz, as can be found out herein-after. The division of sub-bands between different transmission directions of the VDSL connection will be described more closely hereinafter.

In a preferred embodiment of the system in accordance with the invention, the bit stream transmitted to the VDSL connection is divided onto several carriers which are located on the frequency band so that they are placed on bands limited by the worst expected interference bands, i.e. international amateur radio bands. Thus, the transmitter has several parallel modulators, wherein a suitable known modulation method, for example, QAM modulation is used. In each modulation process an individual frequency is used so that the corresponding carrier is placed on the desired sub-band.

International amateur radio bands are presented in the following table, wherein the left column presents the lower limiting frequency of the band while the right column presents the upper limiting frequency of the band.

| Lower limiting frequency (MHz) of the band | Upper limiting frequency (MHz) of the band |
| --- | --- |
| 1.810 | 2.000 |
| 3.500 | 3.800 |
| 7.000 | 7.100 |
| 10.100 | 10.150 |
| 14.000 | 14.350 |
| 18.068 | 18.168 |
| 21.000 | 21.450 |
| 24.890 | 24.990 |
| 28.000 | 29.700 |

It follows from the frequency values presented above that in the method according to the invention the carriers are placed on the following sub-bands, the lower and upper limiting frequencies of which are determined according to amateur radio bands:

| Sub-band No. | Lower limiting Frequency (MHz) | Upper limiting Frequency (MHz) |
| --- | --- | --- |
| 1 | 0.3 | 1.810 |
| 2 | 2.000 | 3.500 |
| 3 | 3.800 | 7.000 |
| 4 | 7.100 | 10.100 |
| 5 | 10.150 | 14.000 |
| 6 | 14.350 | 18.068 |
| 7 | 18.168 | 21.000 |
| 8 | 21.450 | 24.890 |
| 9 | 24.990 | 28.000 |

The transmission rates required of a VDSL connection by the international standardizing bodies can be implemented by using the six lowest sub-bands (sub-bands 1–6). It is preferable to use the lowest sub-band (No. 1) in the downstream direction, because these low frequencies are used in this direction also in the ADSL system. In this way near end crosstalk (NEXT) is avoided, even if both ADSL connections and VDSL connections in accordance with the invention are in the same cable. An examination of the subscriber line capacity with Shannon's law indicates that the transmission rates and connection distances required of VDSL connections can be best achieved when choosing transmission directions for the sub-bands in accordance with FIG. 3. The sub-bands in the upstream direction are shown as hatched. (Shannon's law $C=B\times\log_2(1+S/N)$ tells which is the theoretical maximum information transmission capacity C on a channel, the bandwidth of which is B and the signal-to-noise ratio of which is S/N.)

Figure 3:
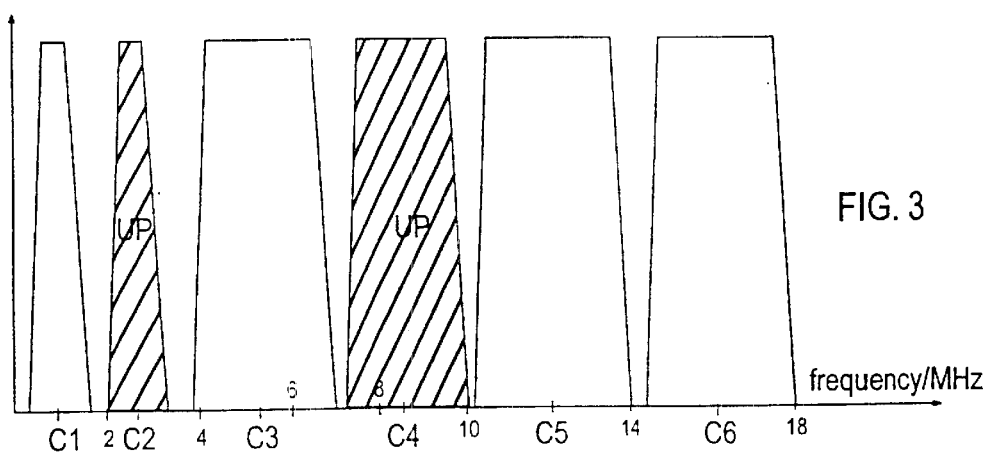
FIG. 3 shows a division of sub-bands between transmission directions.

The transmission division of FIG. 3 was arrived at by using Shannon's law for calculating firstly the capacities of different sub-bands at different connection distances (300 m, 500 m and 1500 m) and by then choosing sub-bands for transmission directions according to their totalled capacity and the bit rate desired in the transmission direction in question. It should be noticed that since attenuation in the cable increases quickly along with a growing frequency, a band on lower frequencies has a correspondingly better signal-to-noise ratio and, according to Shannon's law, also a higher information transmission capacity than a band of equal width at higher frequencies. As regards transmission capacity it is thus not possible to exchange, for example, directions between sub-bands 3 and 4, although the bands are of almost equal width.

It may be noted that the implementation of a VDSL transmission connection used by way of example in this context has been disclosed in detail in the Applicants' international PCT application PCT/FI97/00279 (not published at the time of filing of the present application). This application sets forth in detail for example the transmission rates that have been agreed on for VDSL connections in the different transmission directions and references to the documents in which the VDSL connection is described in more detail.

FIG. 4 depicts an apparatus implementing a transmission connection of the kind described above on a general level. The figure shows both ends of a VDSL connection seen in one transmission direction. The high-speed bit stream DATA_IN to be transmitted to the VDSL transmission connection is fed to symbol forming block 41, which forms symbols of the bits and divides the symbols onto different carriers by feeding them to modulator unit 42, which comprises a number of n parallel QAM modulators A1 . . . An operating at different carrier frequencies. Block 41 feeds the symbol which It has formed directly to the input of its corresponding modulator. Since the signal-to-noise ratio varies with different carriers, a different number of bits per symbol may be used with different modulators. The better signal-to-noise ratio a carrier has the more bits (denser constellation diagram) can be used. The control part of the transmitter, which controls the different modulation processes, is denoted with reference 48.

It is advantageous (a simple implementation of apparatus) for the implementation of apparatus to choose symbol rates for example so that in the upstream direction carrier C4 has a double symbol rate compared to carrier C2, while in the downstream direction carriers C3, C5 and C6 have a double symbol rate compared to carrier C1. Carriers C3 and C4 need not have an equal symbol rate, because transmission takes place in different directions.

If the above-stated adaptive allocation of bits onto different carriers is used in the transmitter, it is worth while to add such a brief training period to the starting phase of the connection which studies how many bits it is advisable to use per symbol on each carrier.

The QAM modulators modulate the signals to different carrier frequencies, which are located in some of the above-mentioned sub-bands 1 . . . 9, in each case preferably essentially in the middle of the frequency band in question.

Output signals from the modulators are fed to summer 43, in which the signals are summed digitally. The digital sum signal is supplied further to line adapter unit 44 typically comprising in sequence a D/A converter, a filter to remove harmonic components occurring in the digital signal, a line driver circuit to raise the output level of the signal to a correct level, a hybrid to separate the transmission and reception branches from each other, a line transformer and a (passive) filter (POTS/ISDN-splitter) to separate POTS/ISDN signals and VDSL signals from each other. The filter output is connected to a channel (wire pair).

At the receiving end the signal is connected first to line adapter unit 45 typically comprising the above-mentioned (passive) filter (POTS/ISDN-splitter), a hybrid to separate the transmission and reception branches from each other, an adjustable amplifier stage, a filter stage and an A/D converter. The filter stage is preferably provided with so-called notch filters operating in amateur radio bands. Since the summer and line adapter units can be implemented in accordance with conventional techniques, their structure will not be described further in this context.

Digital words received from line adapter unit 45 are connected further to demodulator unit 46 comprising n parallel QAM demodulators B1 . . . Bn, whereby n modulator/demodulator pairs are formed (for example, carriers C1, C3, C5 and C6, whereby n=4). Symbol words received from demodulator outputs are supplied to symbol identification circuit 47, which forms the original bit stream DATA_OUT of the baseband symbol words.

Figure 5:
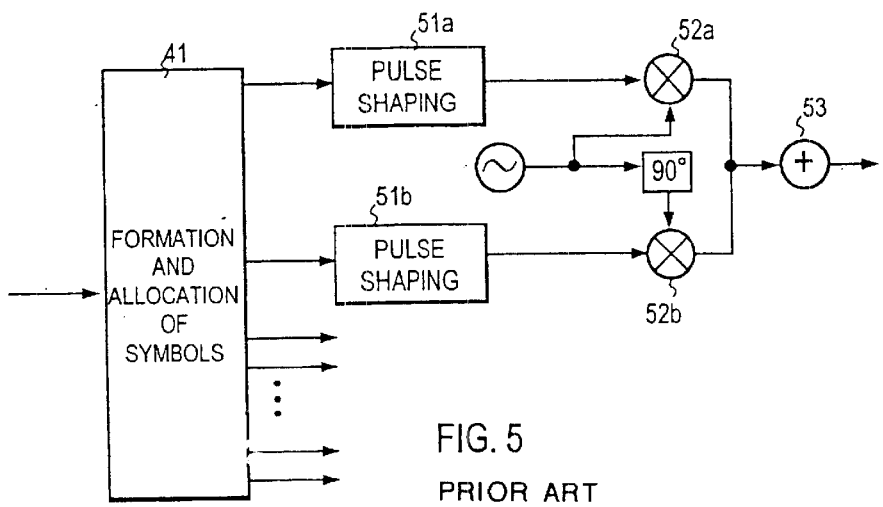
FIG. 5 shows a typical implementation of a modulator block in the apparatus of FIG. 4.

In a system of the kind described above, one modulator block is implemented typically as shown in FIG. 5 The real and imaginary values (I and Q values) obtained from the symbol forming block and corresponding to the constellation points are each fed to a separate pulse shaping block (51a and 51b) in which multiplication of the sampling frequency (interpolation) and low-pass filtering are typically performed. The filtered signal components are transferred directly to the final frequency band in mixers 52a and 52b. The signal components are added together in a summer 53, whereafter a D/A conversion (not shown) is carried out on the sum signal.

As was stated at the beginning, the drawback of such a solution is that filtering, mixing and summing must be carried out at a high frequency, which requires heavy computation and thereby also relatively complex equipment. To generate the above-stated carrier C6, for example, the sampling frequency must be increased in the pulse shaping block to be 30-fold, and in the mixers the multiplications must respectively be performed at a 30-fold rate compared to the sampling frequency.

Figure 6:
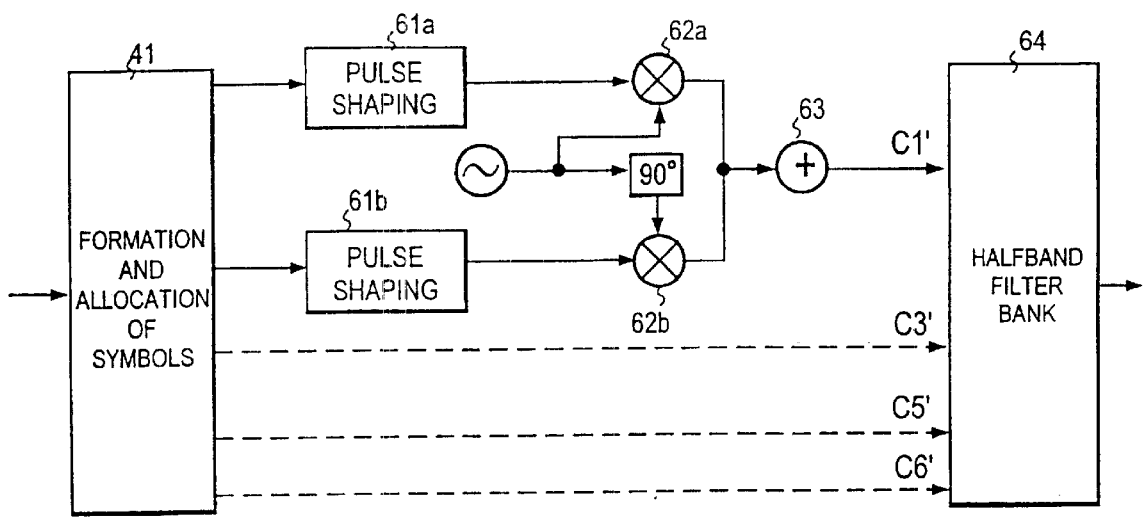
FIG. 6 illustrates the implementation of a modulator block in accordance with the invention in the apparatus of FIG. 4.

In order to enable as far as possible signal processing to be performed at low frequencies, the frequency shifts of the carriers are performed by means of a halfband filter bank. FIG. 6 illustrates a modulator block in accordance with the invention. The real and imaginary values (I and Q values) obtained from the symbol forming block 41, corresponding to the constellation points, are also in this case supplied to their separate pulse shaping blocks (61a and 61b). The operating frequency of the blocks is low, however; in the modulator of the invention pulse shaping blocks and mixers operating for example at three-fold sampling frequency can be used. Thus, the filtered signal components are not transferred to their final frequency band in mixers 62a and 62b, but mixing to a predefined low frequency is performed therein, as will be seen from the appended spectrum graphs. All provisional carriers formed in this way (e.g. downstream carriers C1', C3', C5' and C6') are supplied to halfband filter bank 64, in which the carriers are transferred to their dedicated frequency bands (carrier C1', which the filter bank does not transfer in the frequency domain, makes an exception). Hence, in the solution shown in FIG. 6 frequency shift functions of the modulator unit of FIG. 4 on the one hand and summing functions of the summer of FIG. 4 on the other hand have been implemented by means of the halfband filter bank. After the filter bank, a D/A conversion (not shown) is performed.

Figure 7A:
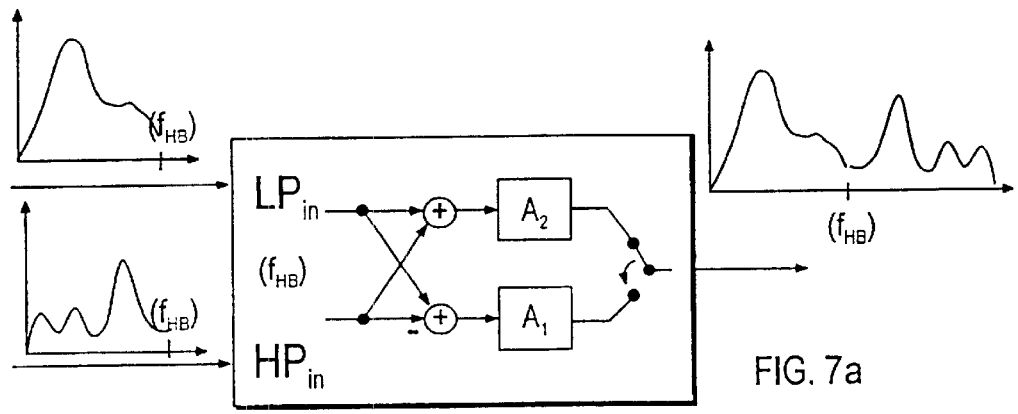
FIG. 7a illustrates the operation of an individual halfband filter in the filter bank of the transmitter.

A halfband filter is a known filter wherewith the sampling frequency can be doubled (interpolation by two) or halved (decimation by two). FIG. 7a illustrates the known interpolating halfband filter used in the transmitter and FIG. 7b the known decimating halfband filter used in the receiver.

The filter comprises two parts, the low pass part and the high pass part, denoted with references LP and HP respectively. The split frequency between these is the halfband frequency $f_{HB}$ of the filter, Which in the case of the interpolation filter is half of the incoming sampling frequency. The spectrum of the signal supplied to the LP input of the interpolation filter is transferred to the filter output as such, but the spectrum of the signal supplied to the HP input is mirrored relative to the halfband frequency, as is shown in FIG. 7a.

The operation of the decimating halfband filter used in the receiver is in principle reverse to that of the interpolation filter used in the transmitter. In this case, the filter (FIG. 7b) has one input and two outputs, an LP output and an HP output. The filter divides the spectrum of the signal supplied to the input into two parts in such a way that the portion below the split frequency is obtained as such from the LP output and the portion above the split frequency is obtained as mirrored relative to the split frequency from the HP output. The halfband frequency of the decimating halfband filter is a fourth of the incoming sampling frequency.

The figures illustrate schematically the structure of the halfband filters by means of a diagram drawn within the filter blocks. In each case, the filter has two separate allpass filter blocks $A_1$ and $A_2$ through which the signals pass in such a way that no frequency is attenuated in relation to the other frequencies. Below the halfband frequency, the allpass filter blocks are inphase filters and above the halfband frequency reverse-phase filters. In the case of the interpolation filter, summing of the signals is performed prior to filtering and in the case of the decimation filter after the filtering. Since halfband filters are known as such, the structure of an individual filter will not be described in detail in this context. The interested reader is referred for example to N. J. Fliege, Multi-Rate Digital Signal Processing, Chapter 2.6, John Wiley & Sons, Chichester, 1994, ISBN 0 471 939765 for a more detailed explication.

The following is a more detailed explanation of the structure and operation of a halfband filter bank in a VDSL system of the kind described above, in which carriers C1, C3, C5 and C6 are generated in the downstream direction and carriers C2 and C4 in the upstream direction, said carriers being placed on frequency bands limited by international radio amateur bands. As was shown above in FIG. 6, a prime has been added to the references of the carriers when a provisional carrier that has not yet been transferred to its final frequency band in the transmitter or a carrier transferred to a lower frequency range in the filter bank of the receiver is concerned. In this exemplary case, halfband filters are provided in four successive stages in the downstream direction and three successive stages in the upstream direction. The halfband frequencies of the filter stages are 1800, 3600, 7200 and 14400 kHz, so that in the first stage the transmitter has the lowest halfband frequency and the receiver the highest halfband frequency. The halfband frequency of each filter is indicated in parentheses between the LP and HP parts.

Figure 10:
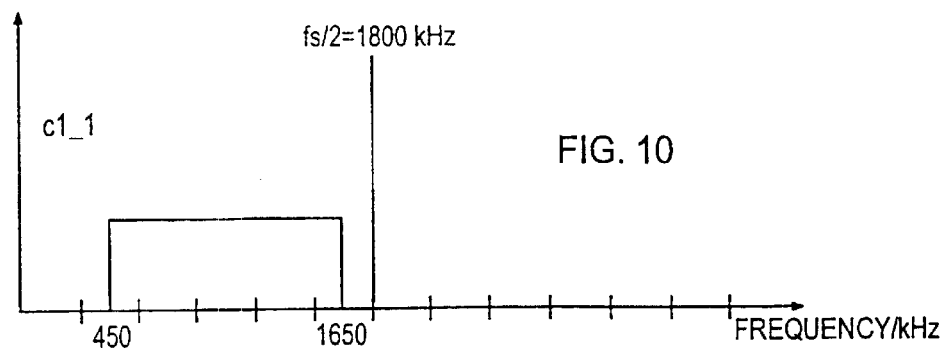
FIGS. 10–26 show signal spectra in the different phases of modulation and demodulation.
Figure 11:
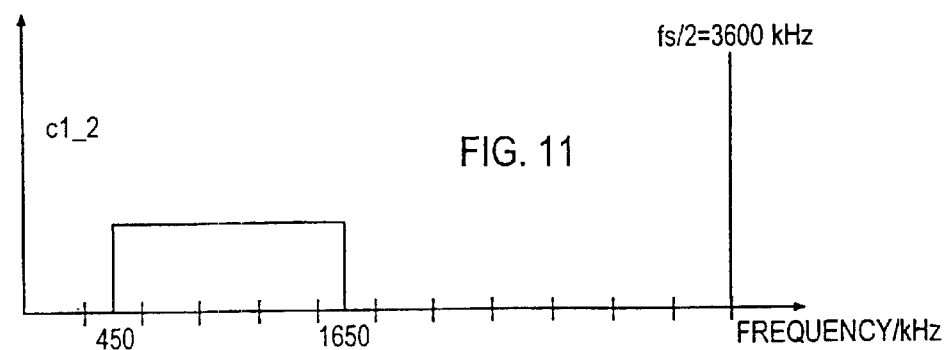
Figure 12:
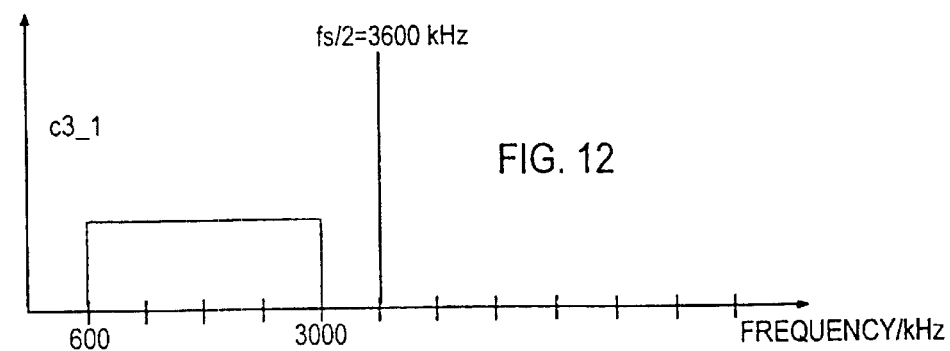
Figure 13:
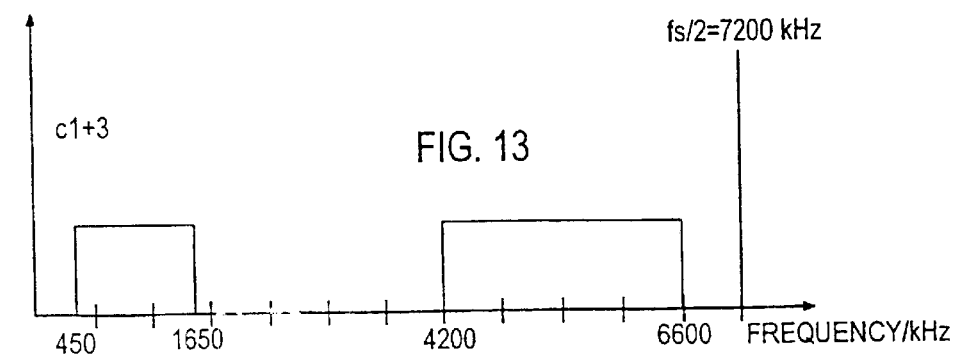
Figure 14:
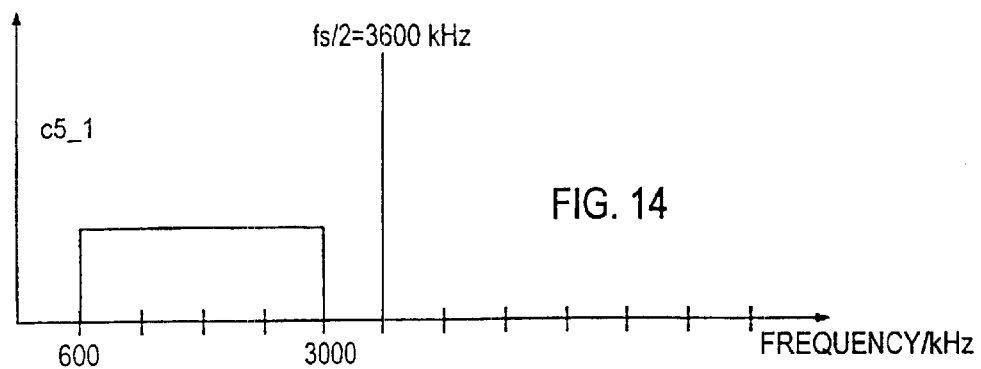
Figure 15:
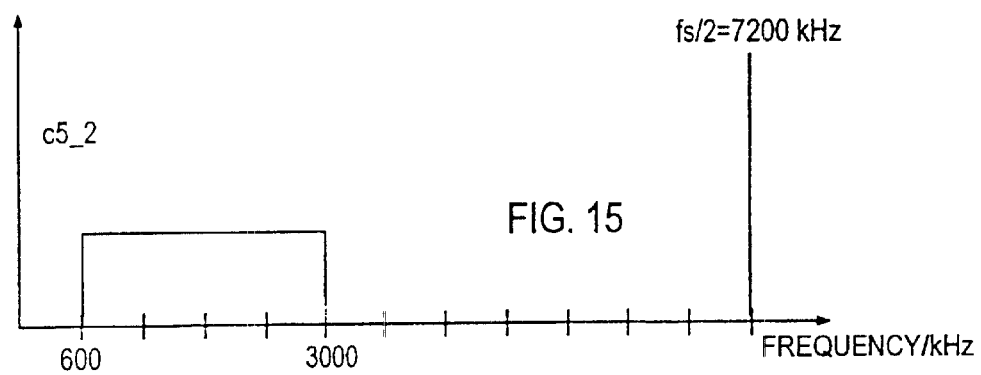

To illustrate the operation of the filter bank, FIGS. 10 ... 26 show signal spectra in the different phases of the frequency shift. Each figure shows the reference number of the spectrum that the figure illustrates. It has been presumed in the figures that the symbol rate on carriers C1 and C2 is 1200 kbaud and on carriers C3, C4, C5 2400 kbaud (i.e., twice the rate of carriers C1 and C2). The spectra are shown as "boxes", in other words, the excess bandwidth is 0%. In practice, however, a transition zone of some size is needed between the passband and the stop band. All spectrum graphs show the carrier frequencies in kilohertz and additionally half of the sampling frequency fs, i.e. the Nyquist frequency, which is the highest frequency that can be represented unequivocally in each phase.

Figures 8A, 8B:
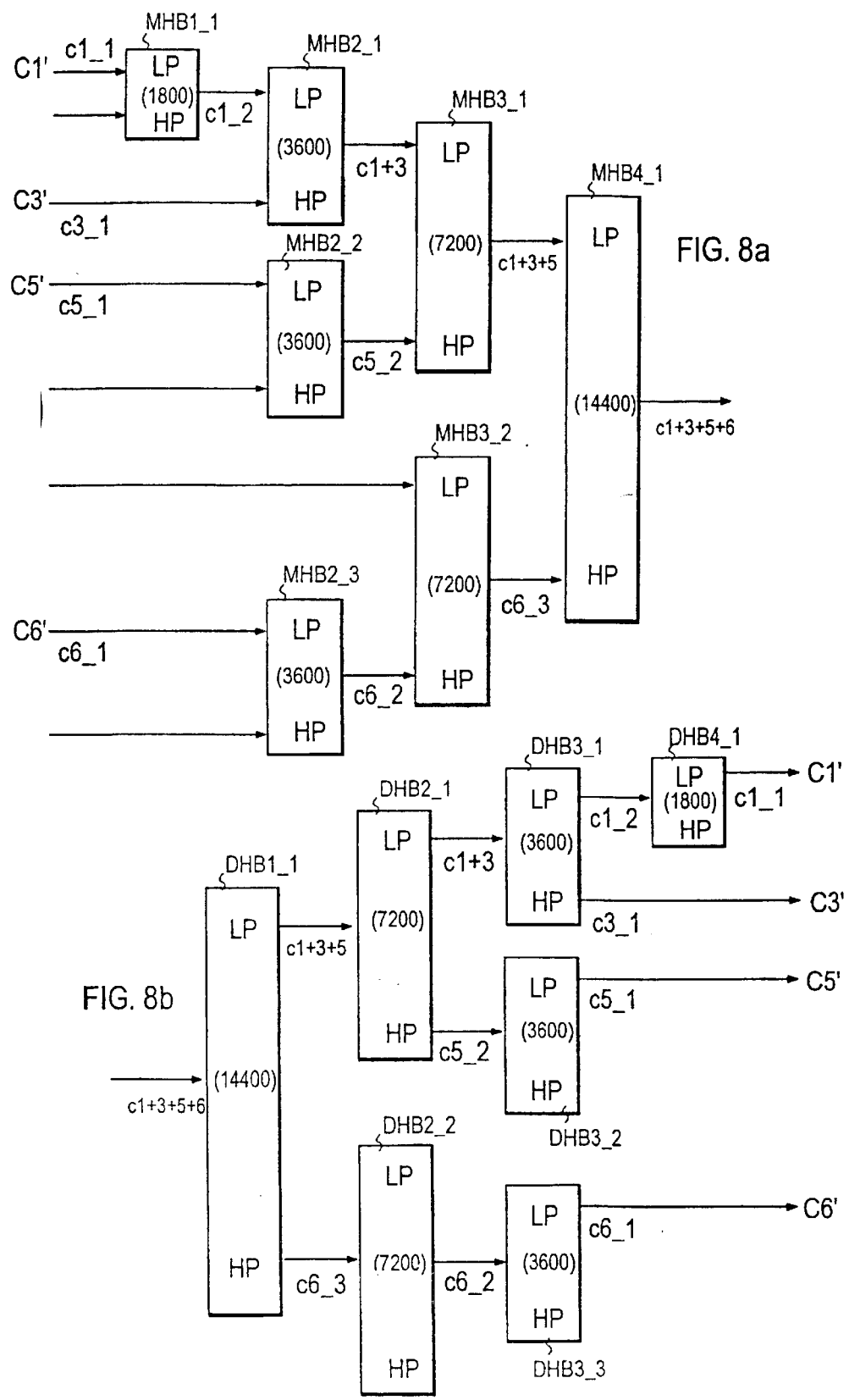
FIG. 8a shows a filter bank of the transmitter in the downstream transmission direction.
FIG. 8b shows a filter bank of the receiver in the downstream transmission direction.
Figure 16:
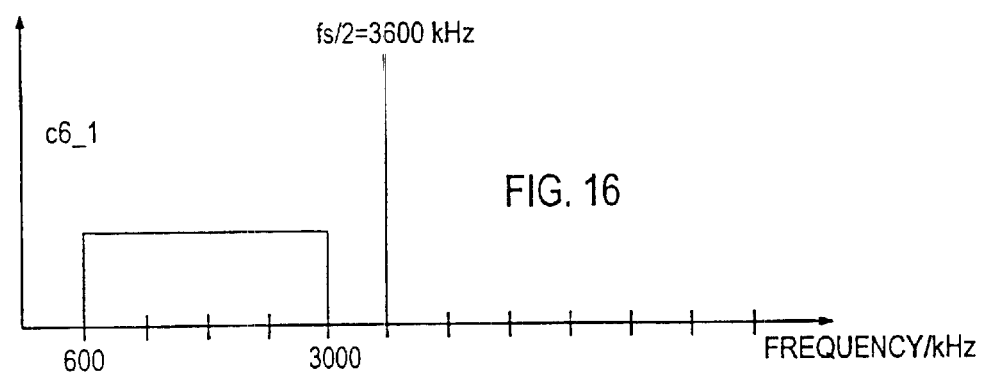
Figure 17:
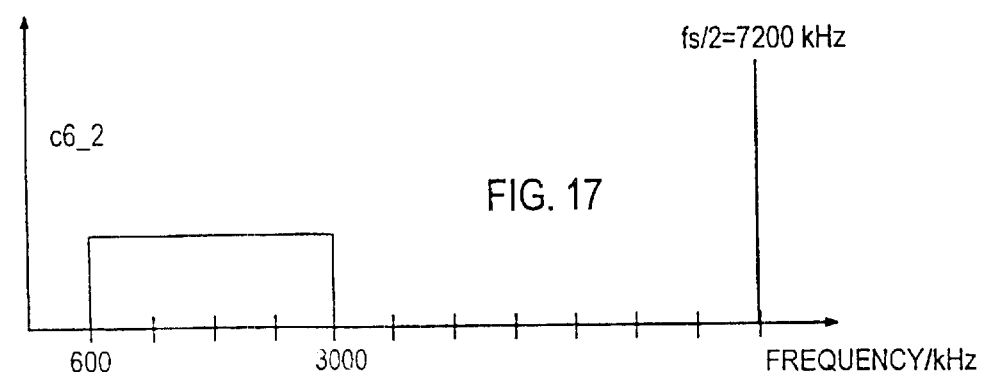
Figure 18:
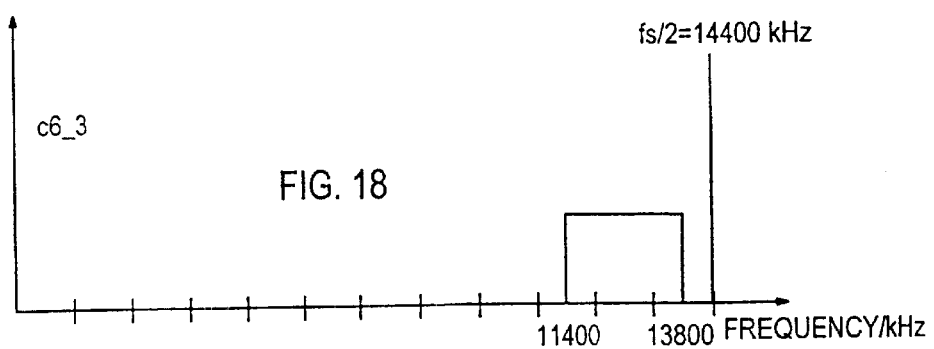
Figure 19:
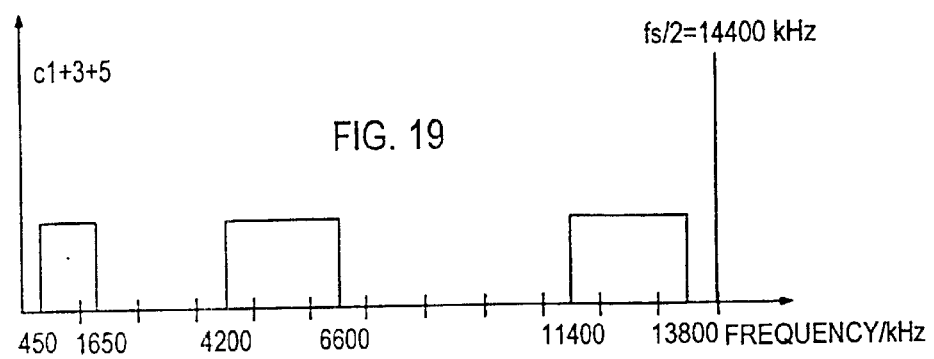

FIG. 8a shows a filter bank of the transmitter in the downstream direction, comprising a total of seven interpolating halfband filters MHBi_j in four successive stages (wherein i is the number of the stage and j is the number of the filter in the stage), one in the first stage, three in the second stage, two in the third stage and one in the fourth stage. Each halfband filter operates in the known manner shown in FIG. 7a, i.e., it forms to its output from two QAM signals sampled at the same frequency a signal in which the sampling frequency is double and the second carrier is "mirrored" relative the original Nyquist frequency. The provisional carrier signals obtained from the mixers are supplied to the filter bank in such a way that signal C1' is supplied to the LP input of filter MHB1_1, signal C3' is supplied to the HP input of filter MHB2_1, signal C5' to the LP input of filter MHB2_2 and signal C6' to the LP input of filter MHB2_3. Zero signals are supplied to the remaining inputs of the filter bank. The inputs and outputs through which signals pass are denoted with references starting with c, indicating the spectrum of the signal concerned which is shown in one of FIGS. 10 ... 26. As will be seen from these figures, the "mixing frequency" for example in the case of carrier C1 is 1050 kHz (FIG. 10) and in the case of carrier C6 1800 kHz (FIG. 16), and thus the frequencies employed are indeed one order less than in the case of FIG. 5. A signal comprising all the carriers is obtained from the output of filter MHB4_1.

Figure 7B:
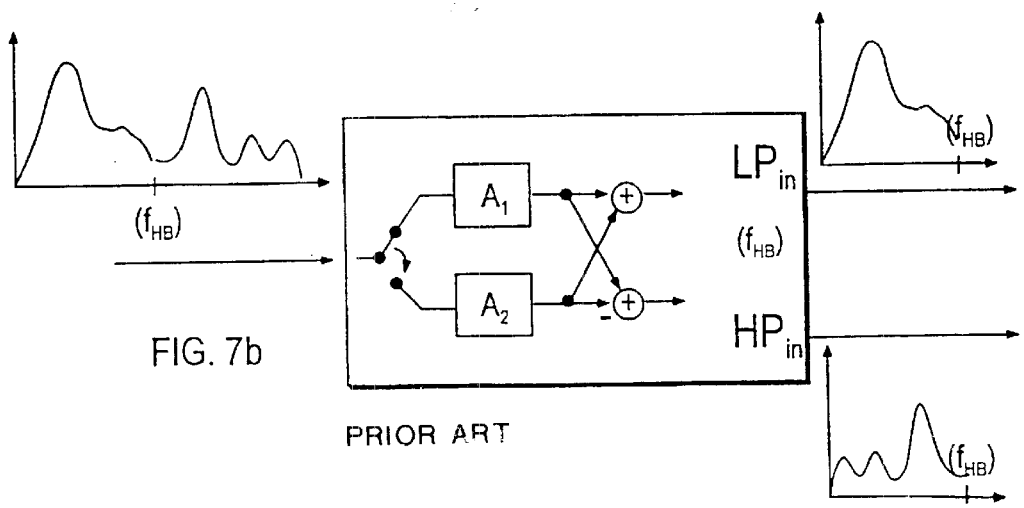
FIG. 7b illustrates the operation of an individual halfband filter in the filter bank of the receiver.
Figure 20:
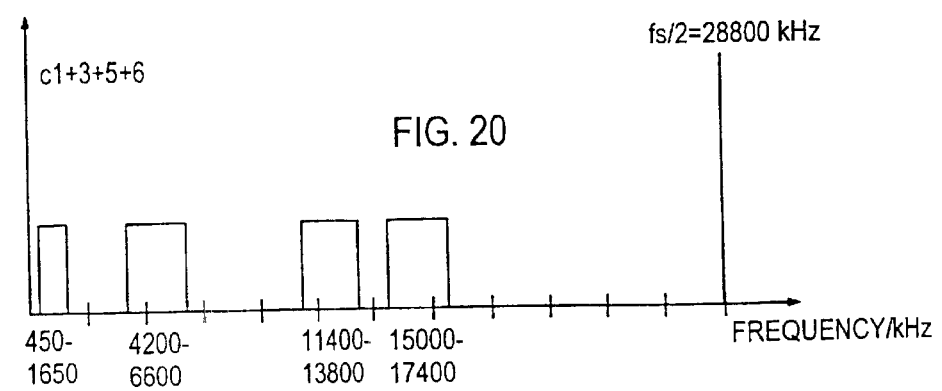
Figure 21:
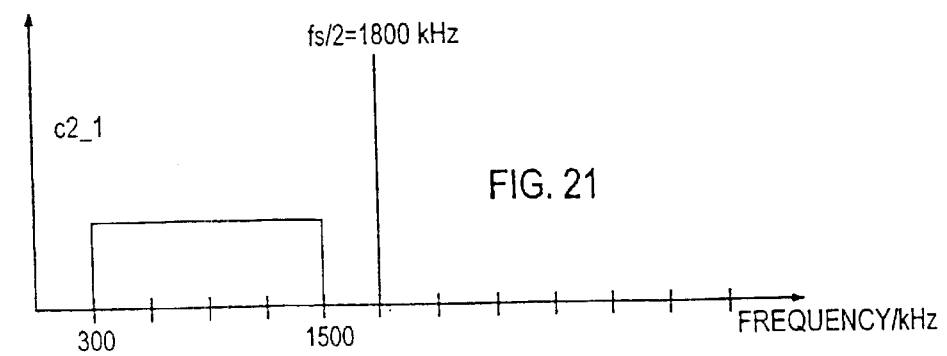
Figure 22:
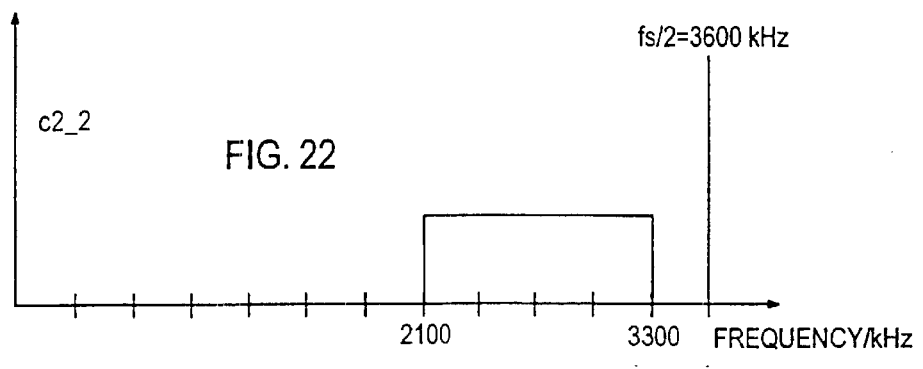
Figure 23:
Figure 24:
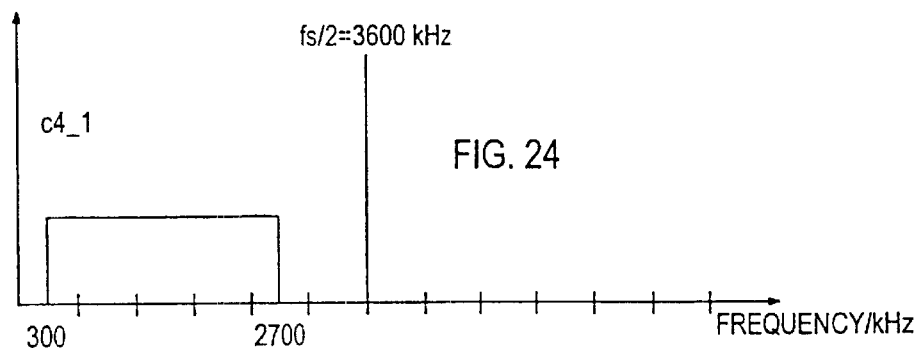
Figure 25:
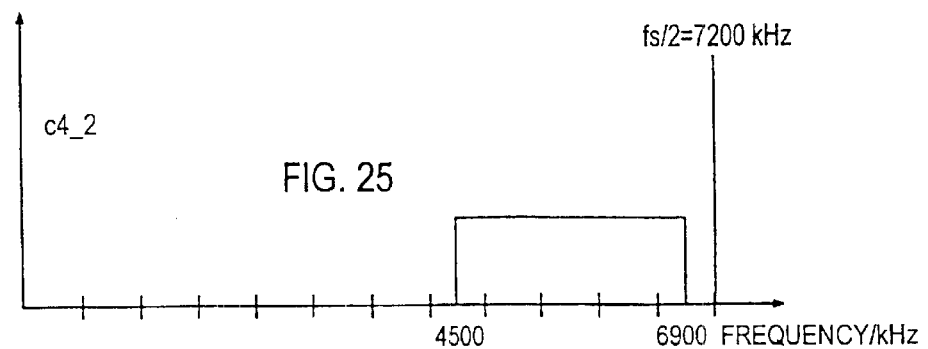

As stated previously, in the receiver each individual filter operates as shown in FIG. 7b. FIG. 8b illustrates a filter bank of the transmitter in the downstream direction, comprising—similarly as the transmitter—a total of seven decimating halfband filters DHBi_j in four successive stages (wherein i is the number of the stage and j is the number of the filter in the stage), one in the first stage, two in the second stage, three in the third stage and one in the fourth stage. A signal having the spectrum shown in FIGS. 3 and 20 (c1+3+5+6) is supplied to the filter bank input, and thus carrier C1' is obtained from the LP output of filter DHB4_1, carrier C3' from the HP output of filter DHB3_1, carrier C5' from the LP output of filter DHB3_2 and carrier C6' from the LP output of filter DHB3_3.

Figure 9A:
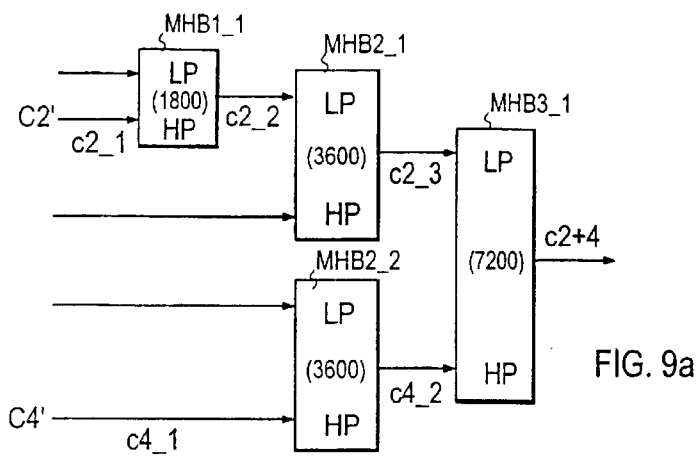
FIG. 9a shows a filter bank of the transmitter in the upstream transmission direction.

FIG. 9a shows a filter bank of the transmitter in the upstream direction, comprising a total of four interpolating halfband filters in three successive stages, one in the first stage, two in the second stage and one in the third stage. The provisional carrier signals obtained from the mixers are supplied to the filter bank in such a way that signal C2' is supplied to the HP input of filter HBF1_1 and signal C4' to the HP input of filter HBF2_2. Zero signals are supplied to the remaining inputs.

Figure 9B:
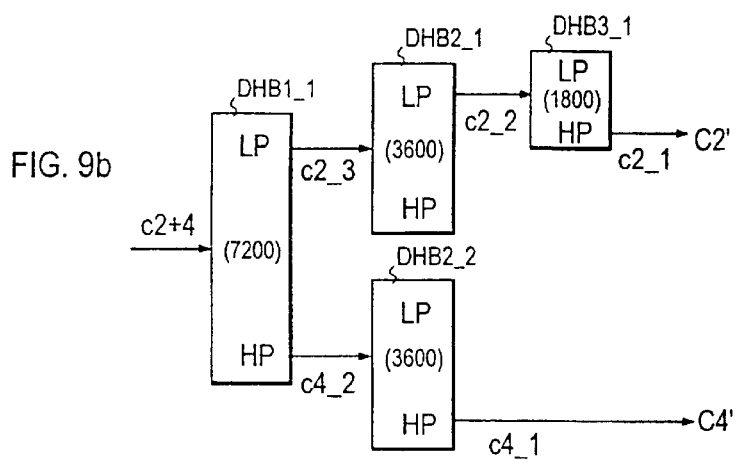
FIG. 9b shows a filter bank of the receiver in the upstream transmission direction.
Figure 26:
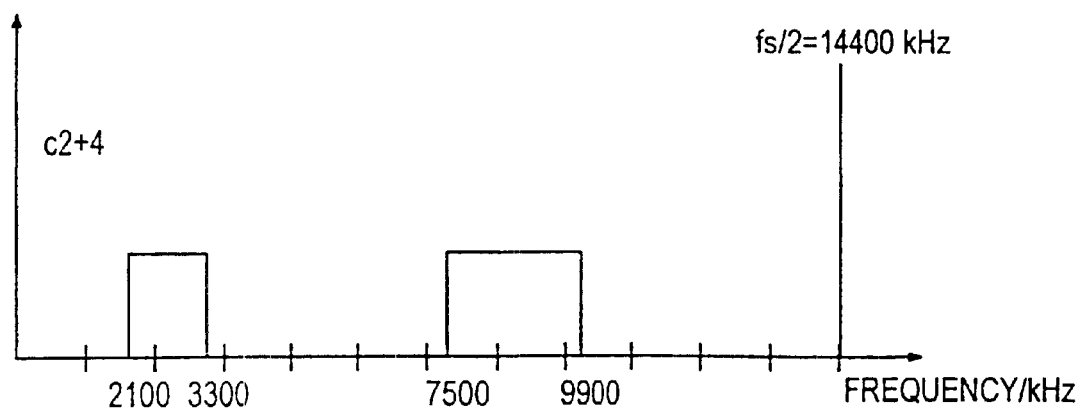

FIG. 9b illustrates a filter bank of the receiver in the upstream direction, comprising—similarly as the transmitter—a total of four decimating halfband filters in three successive stages. A signal having the spectrum shown in FIGS. 3 and 26 is supplied to the filter bank input, and thus carrier C2' is obtained from the HP output of filter DHB3_1 and carrier C4' from the HP output of filter DHB2_2.

Hence, the filter bank of the transmitter connects the carriers connected to the different inputs to the same output, simultaneously carrying out the frequency shifts, and the filter bank of the receiver separates the carriers of the FDM signal connected to the input of the filter bank onto their separate outputs, simultaneously carrying out the frequency shifts.

Figure 9C:
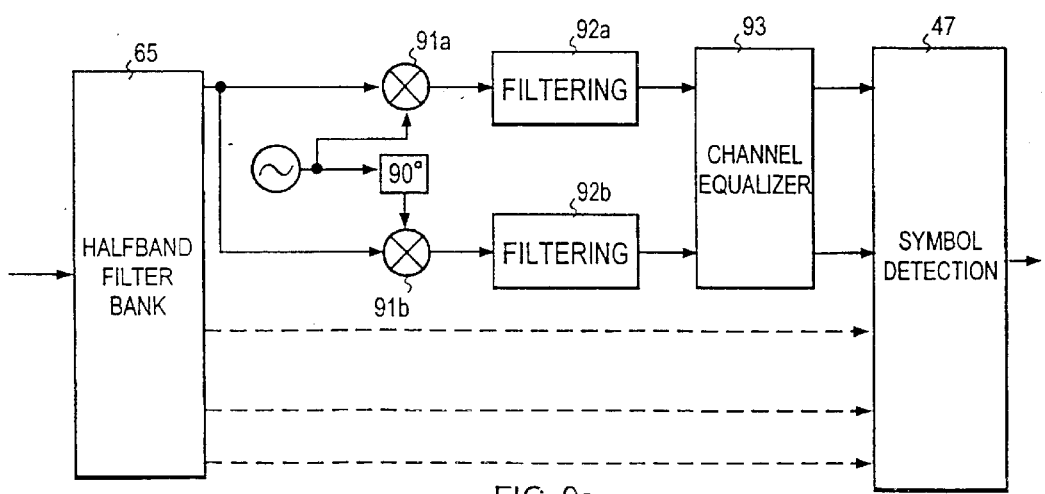
FIG. 9c shows an implementation, in accordance with the invention, of a demodulator block.

FIG. 9c illustrates the implementation of a demodulator block by showing one carrier-specific reception branch (section between the filter bank and the symbol identification circuit). The remaining carriers are processed similarly. The demodulators perform a reverse process to that of the modulator. Down-conversion is first performed on each carrier (e.g. C1', C3', C5' and C6') in mixers 91a and 91b. Thereafter the I and Q components are supplied to their separate lowpass filter blocks (92a and 92b), which remove the interfering spectral components. Thereafter the I and Q components are supplied to channel equalizer 93 wherewith the distortion produced by the channel is removed. Hence, channel equalization is performed separately on each carrier. Since the channel equalization is performed carrier-specifically at low frequencies only, the equalization is simpler to make (compared to equalization performed at a high frequency). From the channel equalizers, the carriers are fed to a symbol identification block.

In the example described above, the ratio of the symbol rate to the halfband split frequency is 1200/1800 or 2400/3600=66.7%. Such a symbol rate (1200 or 2400 kbaud) can be produced by using a pulse shaping filter having an interpolation ratio of three. Thus, in this case 33% of the transmission band is not in actual payload use, but for example radio amateur bands and transitions from the passband to the stop band are located at these frequencies. If a larger portion of the entire band is desired for payload use, the above-described transmission connection can be implemented for example in such a way that the same halfband frequencies are used as above, but the symbol rates are increased to 1350 and 2750 kbaud. In that case, the interpolation factor of the pulse shaping block of the modulator is 8/3 instead of 3, which is effected with an interpolation filter having an interpolation factor of 8 and a decimation block having a decimation factor of 3.

In the above, the solution of the invention has been described using QAM modulation as an example. The implementation of the system can vary for example in accordance with the modulation method used. In a CAP modulator, for instance, the pulse shaping filters are bandpass filters, and there are no mixers (sine and cosine multiplications). Furthermore, in a CAP modulator the pulse shaping filters are not similar but form a Hilbert pair.

The following is a discussion of the advantages of the solution in accordance with the invention as compared to the prior art illustrated in FIG. 5. The discussion pertains to the downstream transmitter.

Let us presume that the pulse shaping filters are FIR filters. In such a case, equally good filtering is achieved in view of bandwidth utilization at a low and at a high sampling frequency when the impulse responses of the FIR filters are equal in time domain (the above-stated excess bandwidth is equally small). If the symbol rate is 1200 kbaud and the highest frequency to be represented is 18 MHz in accordance with the foregoing (C6), 30-fold interpolation is needed in the pulse shaping filter. On carriers corresponding to a symbol rate of 2400 kbaud, 15-fold interpolation is needed respectively.

The obtained number of multiplications N per second is N=1200k (baud rate)*5(filter length in symbol sequences) *30(interpolation ratio)*2(I and Q branches)*1200*2*30 (sine and cosine multiplication)=432000k multiplications per second.

On carriers C3, C5 and C6, an equal number of multiplications is needed, and hence a total of 1728M multiplications per second are needed.

In using a filter bank in accordance with the invention, for carrier C1 the number of multiplications needed in the modulator before the filter bank is N=1200k*5*3*2+ 1200k*2*3=43200k multiplications per second.

For carriers C3, C5 and C6, 2*N multiplications are needed respectively, and hence a total of 7*43200k= 302400k multiplications per second are needed before the filter bank.

Let us presume that three multiplications are carried out per incoming sample period in one halfband block. This will give a number of multiplications N=1200k*3*(1 (sampling frequency compared to sampling frequency of carrier)*3*1 (number of blocks operating at this rate) +2*3*3+4*3*2+ 8*3*1) =248400k multiplications per second.

Hence, in the solution in accordance with the invention a total of 550.8M of multiplications per second are needed, i.e. less than a third of the computation power required in the implementation in accordance with FIG. 5.

Even though the invention has been described in the foregoing with reference to examples shown in the accompanying drawings, it is obvious that the invention is not limited to these, but it can be modified within the scope of the inventive idea presented above and in the appended claims. In modulation and demodulation, for example, the different operations can be carried out in a different order, e.g. multiplication can be carried out before pulse shaping. Furthermore, all carriers need not necessarily be transferred upwards in the frequency domain by means of the filter bank, but some of them can be transferred already in the mixer to the final frequency range. In some special cases, the filter bank may comprise only one halfband filter. Such a situation might arise for example in the above-described system if carriers C1 and C2 were used in the upstream direction, in which case the final signal could be formed in one halfband filter.

What is claimed is:

1. Method for implementing a transmission connection, the method comprising:
   forming symbols from a bit stream to be transmitted,
   generating carriers on several different frequency bands, and
   transmitting the bit stream with the aid of the carriers by dividing the formed symbols between the carriers in such a way that each carrier is modulated with some of the bits in the bit stream, and generating modulated carriers on the transmitter side each separately so that said carriers are located at predetermined first frequencies, supplying at least some of said modulated carriers to a halfband filter bank, transferring at least some of the modulated carriers by means of the halfband filter bank to their final frequency bands in the frequency domain and combining said carriers to the output of the halfband filter bank.

2. A method as claimed in claim 1, wherein in the receiver at least some of the received carriers are supplied to a halfband filter bank transferring at least some of the carriers supplied to it back to the first frequencies.

3. A method as claimed in claim 2, wherein channel equalization is carried out separately on each carrier in the receiver after the halfband filter bank.

4. A method as claimed in claim 1, wherein said first frequencies and the filter bank are implemented in such a way that the carriers obtained from the outputs of the filter bank of the transmitter are located on frequency bands which do not overlap international radio amateur frequency bands.

5. A method as claimed in claim 4, wherein in transferring data from a subscriber to the network, filter banks having a total of four halfband filters in three different stages are used.

6. A method as claimed in claim 4, wherein in transferring data from the network to the subscriber, filter banks having a total of seven halfband filters in four different stages are used.

7. A transmitter system for transmitting a digital bit stream, the system comprising:

symbol forming means for forming symbols from the bit stream to be transmitted, carrier generating means for generating carriers on several different frequency bands, and allocating means for allocating symbols among carriers in such a way that each carrier is modulated with some of the bits in the bit stream, wherein the carrier generating means comprise first means for generating modulated carriers at predetermined first frequencies, and a halfband filter bank to which at least some of the carriers generated by the first means are connected for transferring the carriers to their final frequency bands in the frequency domain.

8. A transmitter system as claimed in claim 7, wherein the filter bank comprises at least three successive stages.

9. A transceiver system for transmitting and receiving a digital bit stream, said system comprising:

at the transmitter end symbol forming means for forming symbols from the bit stream to be transmitted, carrier generating means for generating carriers on several different frequency bands, allocating means for allocating the symbols among carriers in such a way that each carrier is modulated with some of the bits in the bit stream, and at the receiver end detection means for detecting symbols from the received carriers, and symbol identification means for forming a bit stream from the received symbols, wherein the carrier generating means comprise first means for generating modulated carriers at predetermined first frequencies and a first halfband filter bank to which at least some of the carriers generated by the first means are connected for transferring the carriers to their final frequency bands in the frequency domain, and that the detection means comprise the second halfband filter bank to which at least some of the received carriers are connected for transferring the carriers to predetermined lower frequency bands.

10. A transceiver system as claimed in claim 9, wherein the detection means comprise carrier-specific channel equalization means located in the carrier-specific reception branch between the second filter bank and the symbol identification means.

11. A receiver system for receiving a digital bit stream, said bit stream being transmitted with the aid of a carrier on several different frequency bands by forming symbols from the bit stream and allocating the formed symbols among carriers in such a way that each carrier is modulated with some of the bits in the bit stream, the receiver system comprising:

detection means for detecting the symbols from the received carriers, and symbol identification means for forming a bit stream from the received symbols, wherein the detection means comprise a halfband filter bank to which at least some of the received carriers are connected for transferring the carriers to predetermined lower frequency bands prior to detection of the symbols.

12. A receiver system as claimed in claim 11, wherein the detection means further comprise carrier-specific channel equalization means located in the carrier-specific reception branch between the filter bank and the symbol identification means.

* * * * *